US006327997B1

(12) United States Patent
Terry et al.

(10) Patent No.: US 6,327,997 B1
(45) Date of Patent: Dec. 11, 2001

(54) COMBINATION AQUARIUM AND FURNITURE SYSTEM

(76) Inventors: Olivia A. Terry, 10940 Bristol Bay # 406, Bradenton, FL (US) 34209; Lauren O. Dipolito, 128 Brittany Way, Augusta, GA (US) 30907

( * ) Notice: Subject to any disclaimer, the term of this patent is extended or adjusted under 35 U.S.C. 154(b) by 0 days.

(21) Appl. No.: 09/505,284

(22) Filed: Feb. 16, 2000

(51) Int. Cl.$^7$ .................................................. A01K 63/00
(52) U.S. Cl. .......................... 119/246; 119/256; 119/254
(58) Field of Search .................................. 119/246, 253, 119/254, 256, 257; 446/476, 477, 482

(56) References Cited

U.S. PATENT DOCUMENTS

| D. 134,953 | 2/1943 | Greenberg . |
| D. 134,954 | 2/1943 | Greenberg . |
| D. 134,955 | 2/1943 | Greenberg . |
| D. 211,953 | 8/1968 | Whittaker . |
| D. 279,317 | 6/1985 | Goldman, Jr. et al. . |
| D. 294,129 | 2/1988 | Grun . |
| D. 327,142 | 6/1992 | Pilgrim . |
| D. 400,312 | 10/1998 | Wing . |
| 2,040,974 | * 5/1936 | Bigelow ............................... 446/477 |
| 2,791,062 | 5/1957 | Hirsch et al. . |
| 3,326,185 | * 6/1967 | Perez ..................................... 119/254 |
| 3,570,179 | 3/1971 | Yamakawa . |
| 4,044,721 | * 8/1977 | Foley et al. .......................... 119/256 |
| 4,318,945 | 3/1982 | Goldman et al. . |
| 4,974,545 | 12/1990 | Jones . |
| 5,257,596 | 11/1993 | Jones . |
| 5,365,884 | 11/1994 | Jones . |
| 5,597,228 | 1/1997 | Boyle . |

FOREIGN PATENT DOCUMENTS 695990    3/1951  (GB) .

* cited by examiner

Primary Examiner—Robert P. Swiatek
(74) Attorney, Agent, or Firm—Richard C. Litman

(57) ABSTRACT

A combination aquarium and furniture system constructed to accommodate small animals in a human-like setting and for enhancing the aesthetic nature of various living environments, which includes both saltwater and freshwater. To complement the system, a backdrop including a panoramic scene is optionally secured onto an aquarium. The furniture and related items provide an environment which includes a resting place, drinking source, illumination and/or heat source, and an oxygen generating device.

20 Claims, 4 Drawing Sheets

COMBINATION AQUARIUM AND FURNITURE SYSTEM

BACKGROUND OF THE INVENTION

1. Field of the invention

The present invention relates generally to aquariums. More specifically, the invention is a combination aquarium and furniture system which simulates amphibious, water restricted and/or land restricted habitats with human-like living quarters for a variety of small animals.

2. Description of the Related Art

It would not be uncommon to find an aquarium that houses small animals in most households. People have paid an exorbitant amount of money to create the perfect setting for inside their aquariums whether it is for amusement or aesthetic values. The following design patents illustrate a wide variety of ornamental items used for both fluid and non-fluid filled tanks.

U.S. Des. Pat. No. 134,953, U.S. Des. Pat. No. 134,954, and U.S. Des. Pat. No. 134,955, all issued to Albert Green berg on Feb. 2, 1943, display a variety of designs used as aquarium ornaments. One ornamental design includes several rocks attached to a base. Another ornamental design includes several rocks and shells attached to a base. The other design includes a lighthouse mold attached to a base.

U.S. Des. Pat. No. 211,953, issued to Willis J. Whit taker on Aug. 13, 1968, also illustrates an ornamental design of a light house mold attached to a base. U.S. Des. Pat. No. 279,317, issued to Gold man et al. On Jun. 18, 1985, displays an ornamental design of an aquarium vase. U.S. Des. Pat. No. 294,129, issued to Otto Grunt on Feb. 9, 1988, shows an ornamental design for an aquatic sculpture. The sculpture includes fish figures suspended on a string from a plant-like object. The plant like object is attached to a base.

U.S. Des. Pat. No. 327,142, issued to Noel I. Pilgrim, Jr., on Jun. 16, 1992, displays an ornamental design for an aquarium base including several figures attached to the base. The figures include a plurality of fish, a mermaid, a light house, plants, and a rock assembly. U.S. Des. Pat. No. 400,312, issued to Tony Pg Tang Wing on Oct. 27, 1998, illustrates an ornamental design for a toy used in an aquarium. The toy is in the shape of a scuba diver and treasure chest.

The following patents explain different types of aquarium items and objects. U.S. Pat. No. 2,791,062, issued to Hitch, et al. On May 7, 1957, describes a toy diver which is attached to a conically shaped base. The toy diver is to simulate in appearance a frogman from a military mission. The main feature of the toy frogman is for it to sink feet first in a vessel of water. Then, the frogman will stand upright on the bottom of the vessel while remaining submerged and continue in an upright position while automatically rising from the bottom. Finally, the frogman will tilt into a face down swimming position as it partially emerges from the surface of the water.

U.S. Pat. No. 3,570,179, issued to Kazumi Yamakawa on Mar. 16, 1971, details a swimming toy assembly which includes a swimmer body, power unit, and an amphibious car. The power unit includes a functional motor which allows the assembly to move within the water. U.S. Pat. No. 4,318,945, issued to Gold man, et al. On Mar. 9, 1982, explains an underwater aquarium decoration assembly. The assembly includes a plurality of irregularly shaped shells each having side walls and a top wall. The shells are arranged to provide a random variegated rock-like pattern.

U.S. Pat. No. 4,974,545, issued on Dec. 4, 1990, U.S. Pat. No. 5,257,596, issued on Nov. 2, 1993, and U.S. Pat. No. 5,365,884, issued on Nov. 22, 1994, all with inventorship belonging to Richard L. Jones discusses an ornamental assembly for use in aquariums or the like. The ornamental assembly for the first two patents by Jones is for use in a fluid-filled viewing tank for enhancing the aesthetic nature of the tank.

The devices in the above mentioned patents may include a decorative body member and an affixed retaining member for semi-permanently securing each device to an inner surface of a viewing tank. The later patent by Jones is an ornamental assembly for use in non-aquatic viewing cages. The assembly includes a body member formed from a natural piece of driftwood and a fastening assembly for semi-permanently securing the body member to any surface of the viewing cage.

U.S. Pat. No. 5,597,228, issued to Daniel Boyle on Jan. 28, 1997, describes an aquarium landscaping system. Each landscape provides a partition to create different multiple leveled terrains. A light source is located beneath the tank and provides illumination lights up into carrying tubes.

Aquarium items used to display underwater-type ocean and diving scenes are getting old. An ideal set of aquarium items for amusement and aesthetic value would include human-like furniture arranged in human-like settings that also have a functional aspect. A set of aquarium furniture and related items could be interchangeably used to create human-like living quarters or be arrange to look like a back yard.

None of the above inventions and patents, taken either singularly or in combination, is seen to describe the instant invention as claimed. Thus a aquarium furniture and related items solving the aforementioned problems is desired.

SUMMARY OF THE INVENTION

The present invention is aquarium furniture and similar items adapted to accommodate small animals and for enhancing the aesthetic nature of fluid and non-fluid filled aquarium tanks. To complement the present invention, a backdrop including a panoramic scene can be optionally secured onto the back wall of an aquarium.

The aquarium furniture and related items are dimensioned and configured to fit inside a typical glass aquarium having a plurality of side walls and a bottom wall or floor. Each assembly of aquarium furniture and related items give the illusion of human-like living quarters, an office, and back yard.

The furniture and related items can be adapted to provide a resting place, drinking water, an illumination device, a heat source, and a bubbling device. Most of the aquarium furniture will be made from a mold of plastic or ceramic type materials. The aquarium furniture are constructed and made of materials to withstand both saltwater and freshwater fluid-filled aquarium tanks as well as non-fluid filled tanks.

Some aquarium furniture and related items provide the same function to some animals as they would to humans. For example, a sofa is would allow a snake to actually curl up, rest, or sleep upon it. All the aquarium furniture and related items are constructed and arrange for their aesthetic value and amusement.

Accordingly, it is a principal object of the invention to provide a set of aquarium furniture and related items to give the illusion of human-like living quarters, an office, and back yard for amusement purposes.

It is another object of the invention to provide aquarium furniture and related items to be constructed and arranged for their aesthetic values.

Still another object of the invention is to provide aquarium furniture and related items that is adapted to provide a resting place, drinking water, an illumination device, a heat source, and a bubbling device.

It is a further object of the invention to provide aquarium furniture to be constructed and made of materials that withstand both saltwater and freshwater fluid-filled aquarium tanks as well as non-fluid filled tanks.

It is an object of the invention to provide improved elements and arrangements thereof aquarium furniture and related items for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
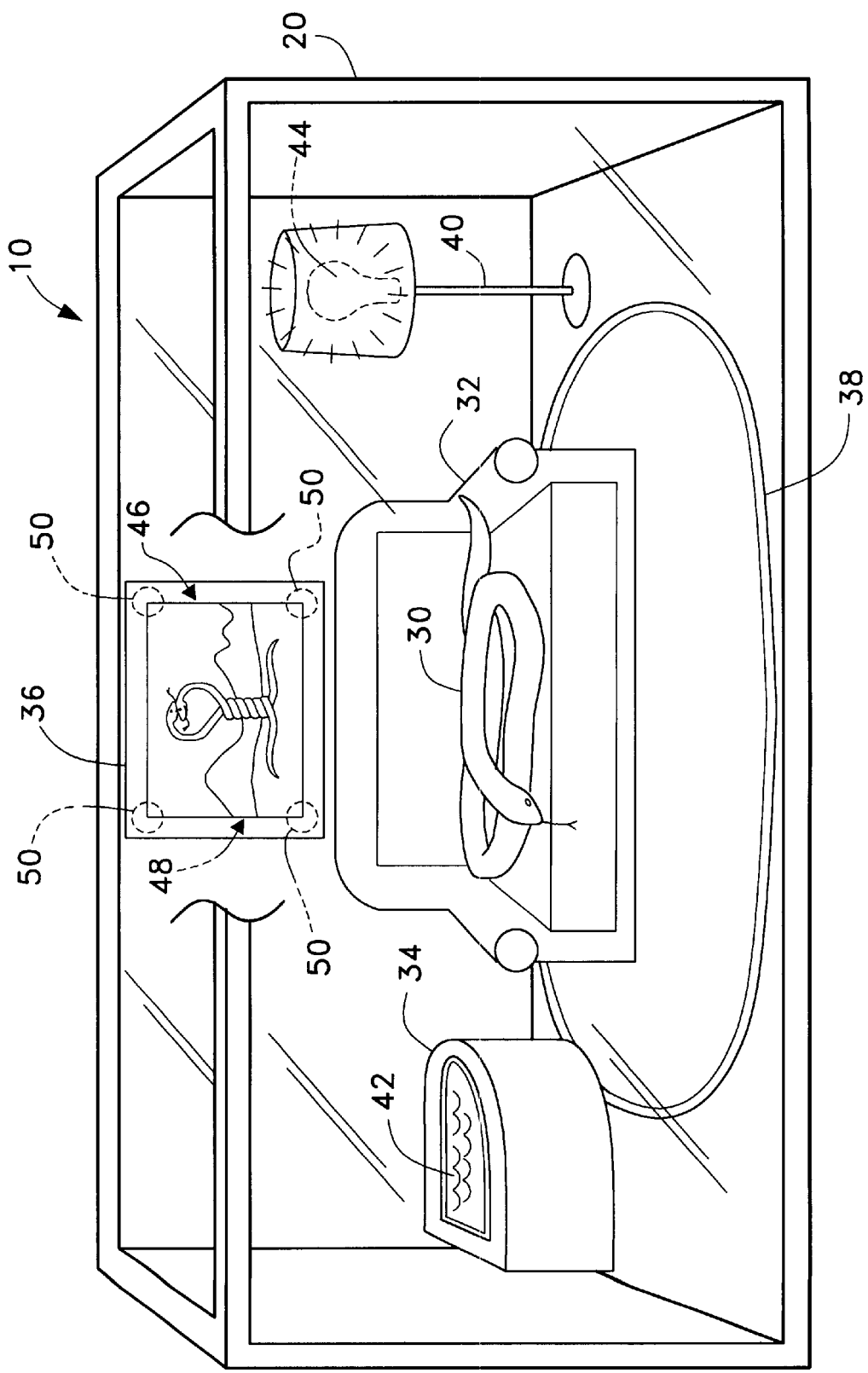
FIG. 1 is an environmental view of aquarium furniture and related items organized to appear as a human-like living room for live animals housed in an aquarium according to the present invention.

The present invention is directed to aquarium furniture and similar items designated as 10 in the drawings. The aquarium furniture would be constructed to accommodate small animals and to enhance the aesthetic nature of both fluid and non-fluid filled aquarium environments. To complement the present invention, a backdrop including a panoramic scene can be optionally secured onto the back wall of an aquarium.

The aquarium furniture and related items are small replica molds of household and office furniture, and back yard items that have been adapted to accommodate small animals that can live in aquarium-like environments. The aquarium furniture and related items are dimensioned and configured to fit inside a typical glass aquarium having a plurality of side walls and a bottom wall or floor. Each wall has an inner and outer surface.

FIG. 1 illustrates the assembly of aquarium furniture and related items 10 to give the illusion of human-like living quarters for a dry environment such as a non-fluid filled aquarium 20 which houses small animals 30. This assembly is one example in how to assimilate a living room which includes a sofa 32, Jacuzzi 34, a plurality of wall pictures 36, floor rug 38, and lamp 40. Most of the aquarium furniture 10 will be made from a mold of plastic or ceramic type materials. The sofa 32 is constructed to accommodate a small aquarium animal 30 such as a snake. The sofa 32 is large enough to allow a small animal 32 to actually curl up on the sofa 32 and sleep, rest, eat, or clean itself.

The Jacuzzi 34 would be constructed to hold actual drinking water 42 for a small animal 30. The lamp 40 can be constructed to receive an illumination device or heating element 44 which gives off heat in the same fashion as an aquarium bulb. As a result, the lamp 40 could replace the aquarium bulb in providing sufficient heat for inside the aquarium 20. Any power supplying means conventional in the art of supplying electricity to illuminate a bulb such as an electric cord or batteries will suffice.

Each wall picture 36 comprises a front 46 and back 48 surface. The back surface 48 of each wall picture 36 includes a plurality of suction cups 50 for securely attaching the back 48 of the picture frame 36 to the inside of the aquarium 20 wall. The rug 38 and all of the above mentioned furniture can be constructed for aesthetic purposes as well.

Figure 2:
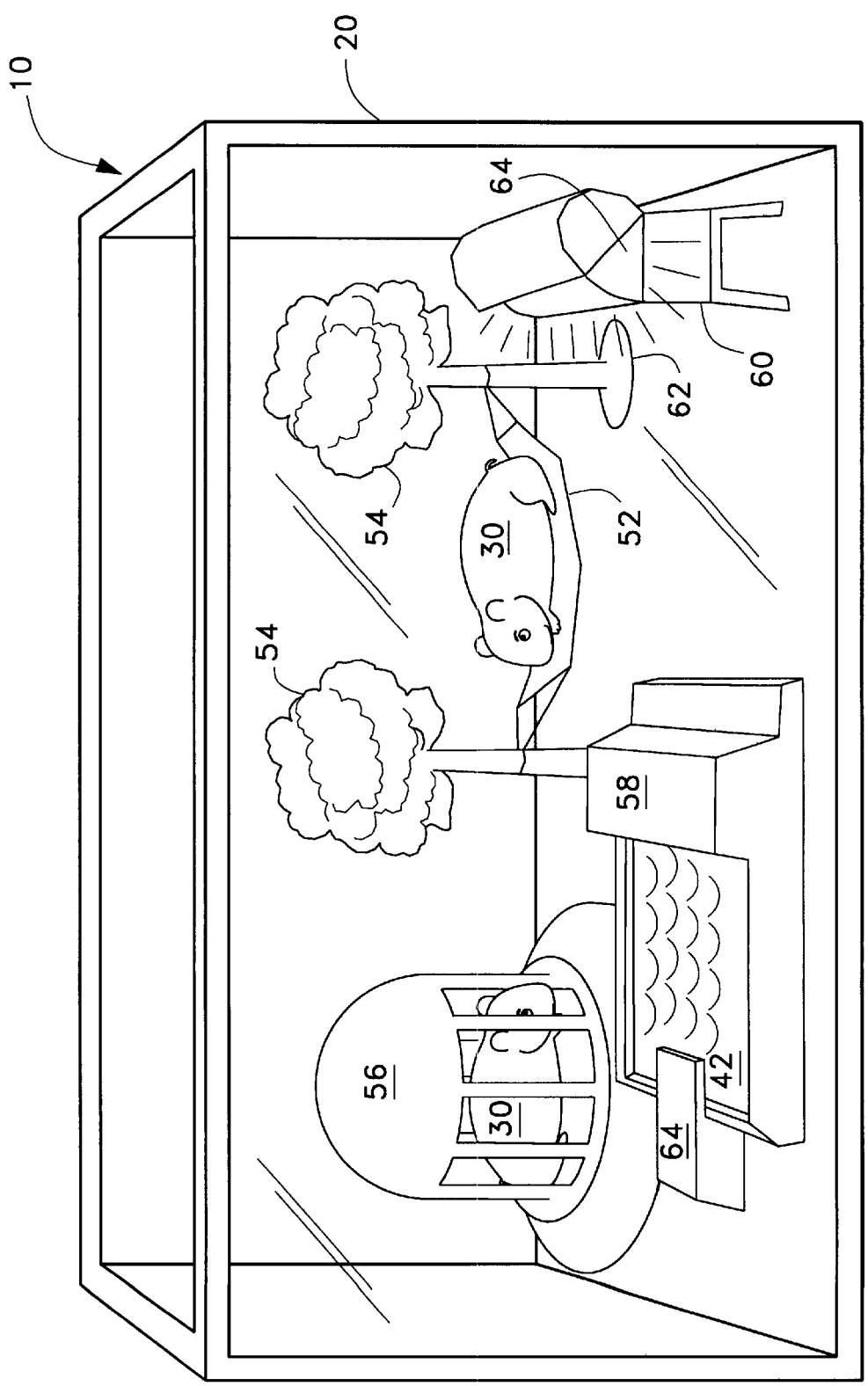
FIG. 2 is an environmental view of aquarium furniture and related items organized to appear as a human-like a back yard for live animals housed in an aquarium of the present invention.

FIG. 2 displays the assembly of aquarium furniture and related items 10 to give the illusion of a landscape scene in a non-fluid filled aquarium 20 for small animals 30. The aquarium items 10 are displayed to assimilate a landscape or a back yard which includes a hammock 52, trees 54, a gazebo 56, diving pool 58, and barbecue 60. Some of the aquarium furniture and items 10 in this landscape scene will also be made from a mold of plastic or ceramic type materials.

The hammock 52 would be constructed of a sturdy flexible rope-like material that is dimensioned and configured to hold a small animal 30 such as a gerbil, mouse, rat, or hamster. The trees 54 could be secured to the sides or bottom of the aquarium tank 20 by any conventional first fastening means 62 in the art of affixing an item to glass. Such removable first fastening means 62 may include suction cups and adhesives like glue, melted wax, and silicon.

The diving pool 58 could be constructed to hold actual drinking water 42 for a small animal 30. The diving board 64 could serve as a platform for the small rodent 30 to rest on while the animal is taking a drink. The gazebo 56 is constructed to house a plurality of small animals 30 for resting or sleeping. The barbecue 60 can be constructed to include an illumination device 64 for producing light and heat. This illumination device 64 within the barbecue 60 could replace the bulb normally utilized in a non-fluid filled aquarium 20.

Figure 3:
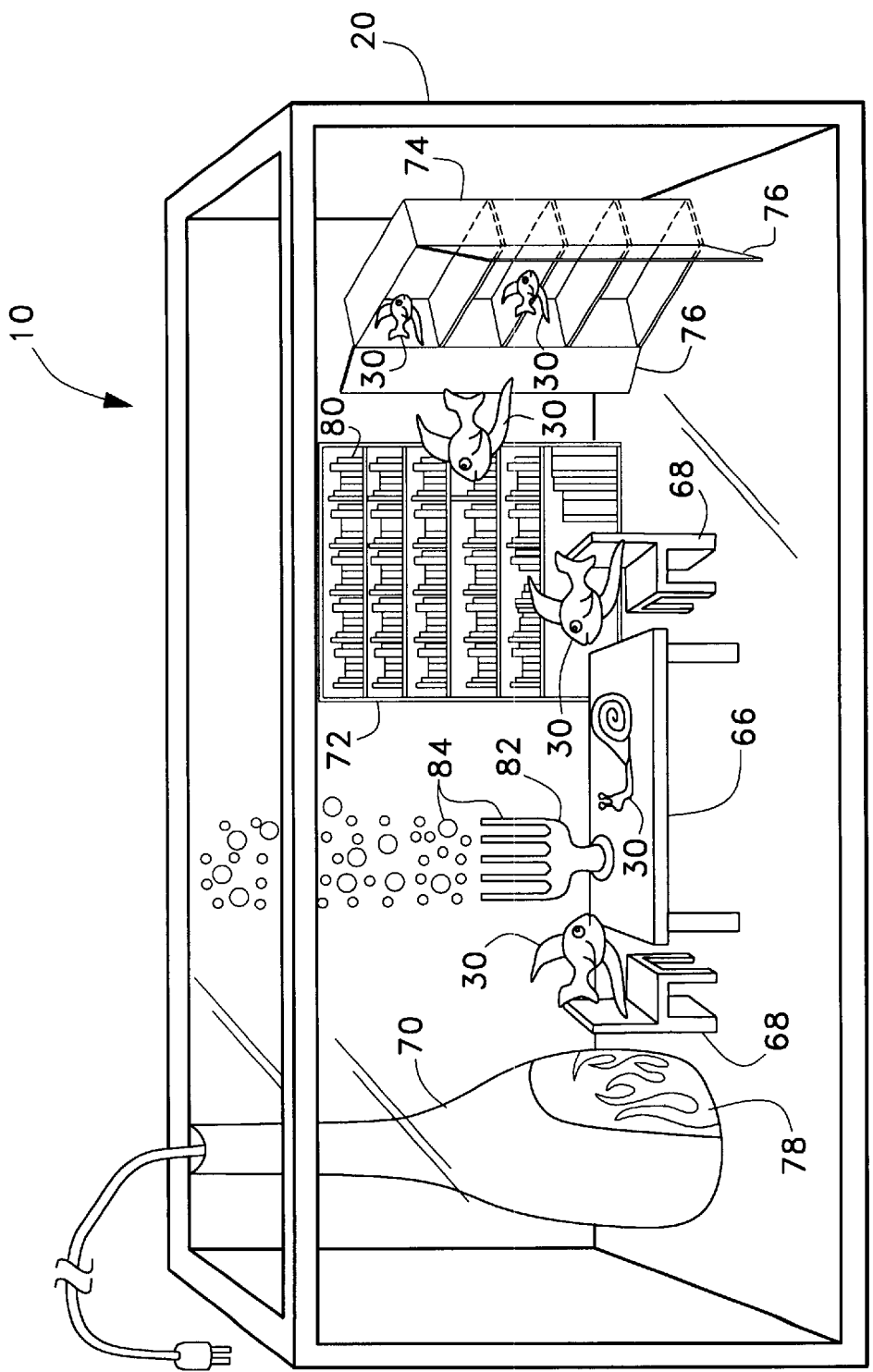
FIG. 3 is an environmental view of aquarium furniture and related items organized to appear as a human-like a dining room for live animals housed in an aquarium of the present invention.

FIG. 3 illustrates the assembly of aquarium furniture and related items 10 to give the illusion of a dining room in a fluid filled aquarium 20 for aquatic fish 30. The aquarium furniture 10 would be made out of mold of plastic or ceramic that is resistant to corrosion in both freshwater and saltwater. The dining room scene may include the following aquarium furniture 10 such as a dining room table 66 and chairs 68, a fireplace 70, a plurality of book shelves 72, and a china cabinet 74.

The dining room table 66 and chair 68 assembly can be arranged in the traditional fashion. Fish and other aquatic animals 30 can swim through and around all the aquarium furniture 10. A china cabinet 74 can include doors 76 that are hingedly connected to allow the doors 76 to remain in the open position so that small aquatic animals 30 such as snails and fish may wander inside the cabinet 74. The cabinet 74 may be made of a sturdy non-corrosive transparent or translucent material in order to view the aquatic animals 30 moving within the cabinet 74.

The fireplace 70 may be constructed to include an illumination device 78 for producing both light and heat. This illumination device 78 within the fireplace 70 could replace the heating units typical used in both saltwater and freshwater aquariums 20. A bookshelf 72 could also be utilized in the aquarium 20 for aesthetics and amusement purposes. As fish swim 30 by the bookshelf 72, the fish 30 could appear to look like they are reading the titles of the books 80. A candle 82 holder display may also function and replace a bubbling device 84 which is typically used in fluid-filled aquariums 20.

For example, a dining room arrangement may include small mold replicas of paintings, pictures, glassware, rugs, candles, vases, ceiling fans, lighting fixtures, sculptures, dining room table and chair set, china cabinet, armoire, etc. A Kitchen arrangement may include appliances, counters, food items, decorative items, dishes, utensils, table and chairs, etc.

A living room arrangement may include a fireplace, mantle, television, stereo, plants, clocks, lamps, games, movie type theater seating, magazines, sofa, loveseat, chairs, recliners, fainting couches, etc. A back yard arrangement may include patio furniture, hammocks, trees/plants, shrubs, decks, gardening items and appliances, grill greenhouse, gazebo, picnic table, umbrella, spa, pool/dive board, driveway, road, houses, etc. A bedroom arrangement may include bed, endtables, mirrors, linens, desks, books, record, vanities, etc.

A library arrangement may include pool tables, ping pong table, computers, exercise equipment, fishing pole, boats, etc. A bathroom arrangement may include a washer/dryer and related bathroom items. An office arrangement may include items and furniture such as cameras, telescopes, and small replicas of people. The above items listed are not exclusive and can include a variety of similar and related items.

Figure 4:
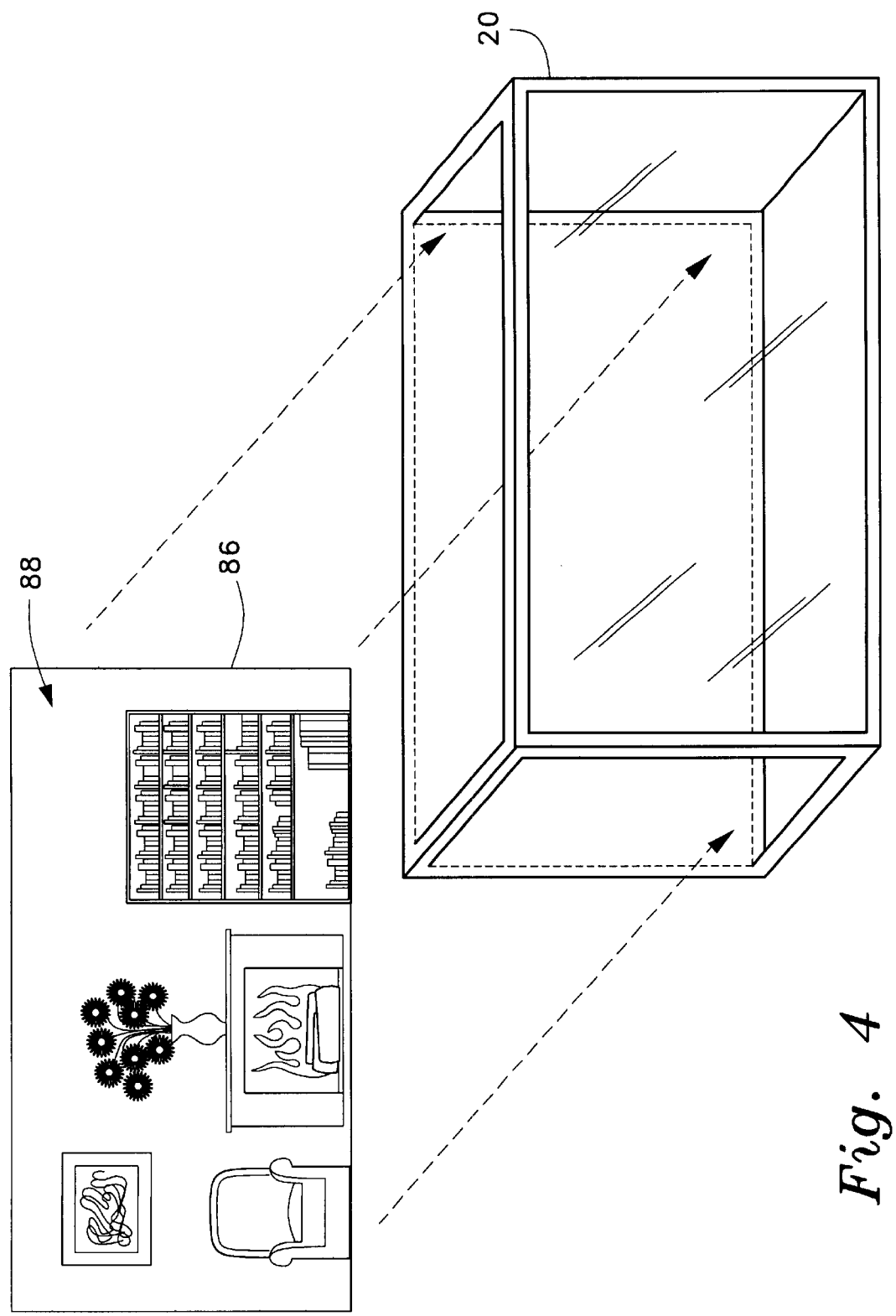
FIG. 4 is an environmental view a backdrop adapted to complement the arrangement of the aquarium furniture and related items of the present invention.

FIG. 4 illustrates the attachment of the complementary backdrop 86 which includes a scenic view of the theme the user is trying to display such as a dining room. The backdrop 86 includes a sheet of material comprising either plastic, paper, wax, or foil-like substance. The backdrop 86 includes printed side 88 with indicia of a panoramic scene, living quarters, or landscape scenery.

The printed side 88 of the backdrop 86 attaches to the outer surface of the back wall of an aquarium 20. The preferred second fastening means used on the backdrop 86 can be transparent or translucent tape (not shown). However, any second fastening means which is conventional in the art that does not interfere will suffice with the scenic picture on the printed side 88.

Most of the aquarium furniture and related items 10 are adapted to accommodate small animals 30 that can live in aquariums 20. All the aquarium furniture and related items 10 are constructed and arrange for their aesthetic values. The composition of each aquarium furniture and/or related items 10 will depend on their function and role they play to accommodate the small animals 30.

It is to be understood that the present invention is not limited to the embodiments described above, but encompasses any and all embodiments within the scope of the following claims.

We claim:

1. A combination aquarium and furniture system comprising:
    an aquarium having a transparent back wall, a plurality of transparent side walls and a floor to define a dry interior for housing a small animal;
    a backdrop attached to the back wall of said aquarium, said backdrop depicting a scene of an interior room or landscape;
    at least one miniaturized furniture item arranged within the interior of said aquarium for supporting the small animal;
    a miniaturized illumination device arranged within the interior of said aquarium, said illumination device simulating a household appliance; and
    a miniaturized drinking water receptacle arranged within the interior of said aquarium, said receptacle simulating a household accessory.

2. The combination aquarium and furniture system according to claim 1, wherein said backdrop depicts a living room.

3. The combination aquarium and furniture system according to claim 2, wherein said at least one miniaturized furniture item includes a replica of a sofa.

4. The combination aquarium and furniture system according to claim 3, further including a miniaturized replica of a rug centered beneath the replica of the sofa.

5. The combination aquarium and furniture system according to claim 3, further including a miniaturized picture having suction cups for attaching the picture to the back wall of said aquarium.

6. The combination aquarium and furniture system according to claim 2, wherein said miniaturized illumination device includes a replica of a floor lamp.

7. The combination aquarium and furniture system according to claim 2, wherein said miniaturized drinking water receptacle includes a replica of a jacuzzi.

8. The combination aquarium and furniture system according to claim 2, further including fastening means for securing said at least one miniaturized furniture item, said miniaturized illumination device, and said miniaturized drinking water receptacle to the interior of said aquarium.

9. The combination aquarium and furniture system according to claim 1, wherein said backdrop depicts a landscape scene.

10. The combination aquarium and furniture system according to claim 9, wherein said at least one miniaturized furniture item includes a replica of a hammock supported by a miniaturized replica of a pair of trees.

11. The combination aquarium and furniture system according to claim 9, wherein said miniaturized illumination device includes a replica of a barbecue.

12. The combination aquarium and furniture system according to claim 9, wherein said miniaturized drinking water receptacle includes a replica of a diving pool.

13. The combination aquarium and furniture system according to claim 9, further including a miniaturized replica of a gazebo structure arranged within the interior of said aquarium.

14. A combination aquarium and furniture system comprising:

- an aquarium having a transparent back wall, a plurality of transparent side walls and a floor to define a fluid-filled interior for housing aquatic animals;
- a backdrop attached to the back wall of said aquarium, said backdrop depicting a scene of an interior room;
- at least one miniaturized furniture item arranged within the interior of said aquarium;
- a miniaturized illumination device arranged within the interior of said aquarium, said illumination device simulating a household appliance; and
- a miniaturized bubbling device arranged within the interior of said aquarium, said bubbling device simulating a household accessory.

15. The combination aquarium and furniture system according to claim 14, wherein said backdrop depicts a dinning room scene.

16. The combination aquarium and furniture system according to claim 15, wherein said at least one miniaturized furniture item includes a replica of a dinning table and chairs.

17. The combination aquarium and furniture system according to claim 15, wherein said at least one miniaturized furniture item includes a replica of a bookcase.

18. The combination aquarium and furniture system according to claim 15, wherein said at least one miniaturized furniture item includes a replica of china cabinet.

19. The combination aquarium and furniture system according to claim 14, wherein said miniaturized illumination device includes a replica of a fireplace.

20. The combination aquarium and furniture system according to claim 14, wherein said miniaturized bubbling device includes a replica of a candle holder.

* * * * *